(12) United States Patent
Meneghin et al.

(10) Patent No.: US 6,214,439 B1
(45) Date of Patent: Apr. 10, 2001

(54) COMPOSITE LAMINATE, METHOD FOR DECORATING PANELS WITH THE LAMINATE, AND PANEL OBTAINED BY THE METHOD

(75) Inventors: Dino Meneghin; Stefano Lorenzon, both of Salgareda (IT)

(73) Assignee: 3B S.p.A., Salgareda (IT)

( * ) Notice: Subject to any disclaimer, the term of this patent is extended or adjusted under 35 U.S.C. 154(b) by 0 days.

(21) Appl. No.: 09/402,711
(22) PCT Filed: Apr. 7, 1998
(86) PCT No.: PCT/EP98/02018
§ 371 Date: Oct. 8, 1999
§ 102(e) Date: Oct. 8, 1999
(87) PCT Pub. No.: WO98/45129
PCT Pub. Date: Oct. 15, 1998
(51) Int. Cl.[7] .............. B41M 3/06; B32B 29/00
(52) U.S. Cl. .......... 428/141; 428/141; 428/142; 428/151; 428/156; 428/58; 428/172; 428/187; 428/113; 428/192; 156/345; 156/349; 156/384; 118/715; 430/269

(58) Field of Search ............... 118/715; 156/345, 156/349, 384; 430/269; 428/141, 142, 151, 156, 58, 172, 187, 113, 192

(56) References Cited

U.S. PATENT DOCUMENTS

| 3,874,966 | 4/1975 | Garcia . |
| 5,275,862 | 1/1994 | Ramadan . |

FOREIGN PATENT DOCUMENTS

| 4032139 | 4/1992 | (DE) . |
| 0019221 | 11/1980 | (EP) . |
| 0019221 | 5/1990 | (EP) . |
| 2034251 | 6/1980 | (GB) . |
| 2291007 | 1/1996 | (GB) . |

*Primary Examiner*—Richard Weisberger

(57) ABSTRACT

A composite thermoplastic continuous laminate for cladding flat or shaped panels of wooden material, said laminate having a through-colored lower layer, an intermediate layer of transparent material, and a through-colored upper layer of different color from that of said lower layer.

25 Claims, 1 Drawing Sheet

COMPOSITE LAMINATE, METHOD FOR DECORATING PANELS WITH THE LAMINATE, AND PANEL OBTAINED BY THE METHOD

This application is the national phase under 35 U.S.C. §371 of PCT International Application No. PCT/EP98/02018 which has an International filing date of Apr. 7, 1998, which designated the United States of America.

FIELD OF THE INVENTION

The present invention relates to a composite laminate and a method for decorating panels with the laminate.

DESCRIPTION OF THE PRIOR ART

Panel decorating methods are known comprising a preliminary stage of pantograph-machining the surface of an MDF substrate to obtain shapes therein corresponding to a predetermined pattern, and a stage in which a thermoplastic laminate cladding sometimes having the color and graining of wood is applied. The panel prepared in this manner is heated to obtain partial softening of the cladding sheet, which by suitable working adheres to the thus modified surface of the panel.

Other methods have also been proposed using a composite material formed from two different-color layers of through-colored thermoplastic material. After being applied to the MDF panel, these are again pantograph-machined to remove the upper layer and reveal the lower layer, which in this manner creates the desired ornamental motif.

GB-A-2.034-251 discloses a board for use in making pictures or designs comprising a base sheet of which one side has a facing covered by a tansparent buffer layer which extends over the whole of the facing. The buffer layer is covered by a dense opaque surface which can be scratched off or removed by light surface engraving.

EP-A-0 019 221 discloses a sheet-like material based on a web of paper or plastic film and having a wood grain pattern applied to at least one lateral surface, at least one underlying printed image corresponding to a photographic color separation of a wood original being directly or indirectly printed on the web. The printed image is masked by a continuous transparent protective layer, and the transparent protective layer, bears a pore structure on the basis of a further color separation of the wood original.

An object of the present invention is to provide an improved composite laminate which by suitable treatment provides a pleasant outer appearance to the panel to which it is applied.

A further object of the present invention is to provide a composite laminate which may be applied to panels obtained with traditional pantograph machines.

BRIEF SUMMARY OF THE INVENTION

These and further objects will be apparent from the present invention which defines a composite therrmoplastic continuous laminate for cladding panels of wooden material, comprising a through-colored lower layer, an intermediate layer of transparent material, and a through colored upper layer of different colour from the lower layer. The expression "through-color" is intended to mean that the color of the layer extends through the layer from one side to the other thereof.

The present invention contemplates a method for decorating flat or shaped panels of wooden material with the thermoplastic composite laminate, wherein before or after said composite laminate has been applied to a panel to be decorated, localised removal of said upper layer is carried out until the transparent intermediate layer is reached.

BRIEF DESCRIPTION OF THE DRAWINGS

Some preferred embodiments of the present invention are described in detail hereinafter by way of a non-limiting example, with reference to the accompanying drawings, in which.

DESCRIPTION OF PREFERRED EMBODIMENTS

As can be seen from the figures, the decoration method of the present invention uses a composite continuous laminate formed from:

- a lower layer 2 forming a base support and constructed of through-colored thermoplastic material, such as PVC or polypropylene,
- an intermediate layer 4 of transparent material, also constructed of a thermoplastic material, and
- an upper layer 6 of through-colored material of a different color and/or characteristics from the constituent material of the lower layer. Preferably also this layer consists of PVC or polypropylene.

A layer of primer is applied to the outer surface of the lower layer 2 to facilitate the bonding of the composite laminate to the panel on application.

A layer of transparent material 8, in a varnish or sheet form or both, is applied to the outer surface of the upper layer 6. The purpose of the varnish is to provide the product with resistance to scratching and to chemical agents, whereas the purpose of the sheet, in the case of printed products, is to protect the print from abrasion in accordance with DIN 6861.

The thickness of the said layers varies from 0.001 mm to 1 mm.

According to the method of the present invention, before or after applying the composite laminate, preferably by glueing and pressing, to a MDF panel which may be flat or shaped, the composite laminate is subjected to localized removal of the upper layer 6 until the transparent layer 4 is reached, so that the person viewing the panel sees cladding having the appearance of the upper layer 6 and, in regions where said layer 6 has been removed, the lower layer 2.

The localized removal can be effected by chemical treatment (solvent) or by mechanical machining (scraper or pantograph).

Figure 1:
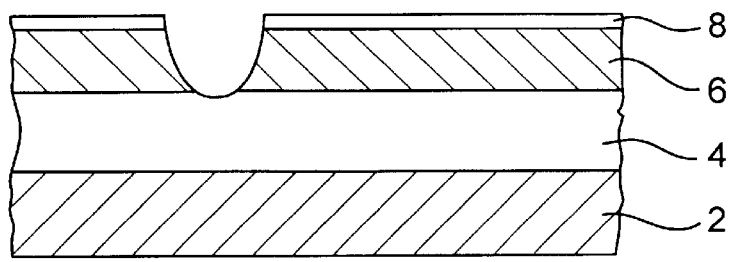
FIG. 1 is a cross-section through a composite laminate usable in the method of the present invention.
Figure 2:
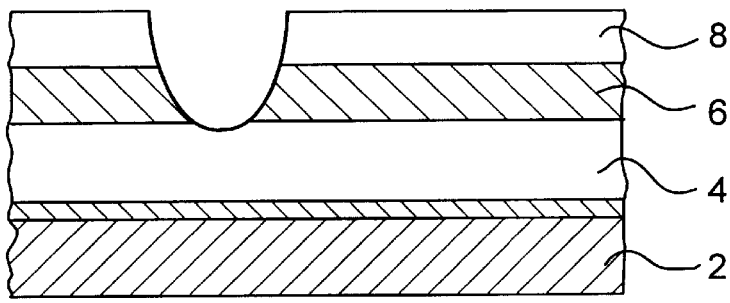
FIG. 2 shows a modification thereof.

In the embodiment shown in FIG. 2 the lower layer or base support 2 has that surface in contact with the intermediate layer 4 printed to display colors and graining reproducing a particular type of wood, the upper layer 6 again being a through-colored layer of thermoplastic material. In this case, following the localized removal, a panel is seen clad with plastic material which in the removed regions displays the underlying wood-type surface.

Figure 3:
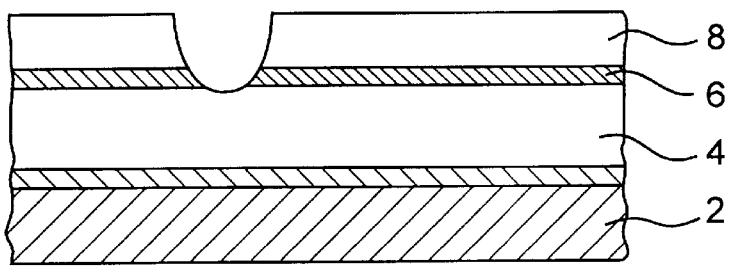
FIG. 3 shows a further modification thereof.

In the embodiment shown in FIG. 3 the transparent layer 4 has both its surfaces printed in the form of two different types of wood, the upper of these surfaces being covered with a layer of transparent thermoplastic material 8, which is subsequently varnished.

In this case the localized material removal gives the effect of a panel formed from two different types of wood, which overall give the effect on inlaid wood, but produced by an industrial method.

Figure 4:
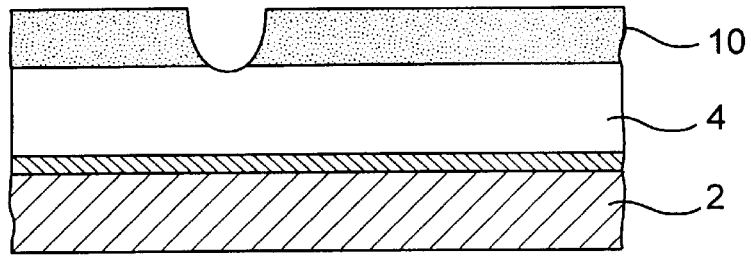
FIG. 4 shows yet another modification thereof.

In the embodiment shown in FIG. 4, the inner surface of the lower layer or base support 2 is printed, whereas to the upper surface of the transparent layer 4 there is applied a layer of colored pigmented varnish 10. In this manner, following localized removal, the effect is obtained of an overpainted wooden panel.

What is claimed is:

1. A composite thermoplastic continuous laminate comprising a through-colored lower layer, an intermediate layer of transparent material, and a through-colored upper layer having a different color from that of the lower layer.

2. The composite laminate as claimed in claim 1, wherein a layer of primer is applied to an outer surface of the lower layer to facilitate its bonding to a panel.

3. The composite laminate as claimed in claim 1, wherein the lower layer is a PVC layer.

4. The composite laminate as claimed in claim 1, wherein the lower layer is a polypropylene layer.

5. The composite laminate as claimed in claim 1, wherein the upper layer is a PVC layer.

6. The composite laminate as claimed in claim 1, wherein the upper layer is a polypropylene layer.

7. The composite laminate as claimed in claim 1, wherein the transparent layer is a thermoplastic material.

8. The composite laminate as claimed in claim 1, wherein the lower layer is a sheet of a thermo-deformable material having its surface printed to display colors and graining which reproduce a particular type of wood.

9. The composite laminate as claimed in claim 1, wherein the upper layer is printed with a pattern that resembles wood.

10. The composite laminate as claimed in claim 9, wherein a transparent protection layer is applied to the upper layer.

11. The composite laminate of claim 10, wherein the protection layer is a transparent varnish.

12. The composite laminate of claim 10, wherein the protection layer is a sheet of thermoplastic material.

13. The composite laminate of claim 10, wherein the protection layer is a combination of a sheet of thermoplastic material and a layer of transparent varnish.

14. The composite laminate as claimed in claim 1, wherein both surfaces of the intermediate layer are printed in accordance with colors and characteristics of different types of wood.

15. The composite laminate as claimed in claim 1, wherein the upper layer is a colored, pigmented varnish.

16. The composite laminate of claim 1, wherein a portion of the upper layer and/or lower layer is removed to expose the intermediate transparent material.

17. A composite thermoplastic, continuous laminate comprising a through-colored lower layer made of a thermoplastic material, an intermediate layer of transparent thermoplastic material and a through-colored upper layer of a thermoplastic material, said upper layer having a color characteristic which is different from said lower layer and wherein a portion of the upper layer and/or lower layer is removed to expose the intermediate transparent material.

18. The composite of claim 17 applied to a panel as a decoration.

19. A method for manufacturing a composite thermoplastic, continuous laminate which comprises forming a lower layer of a thermoplastic material having a colored characteristic, forming an intermediate layer of a transparent thermoplastic material on said lower layer, and forming an upper layer of a thermoplastic material on said intermediate layer, said upper layer having a colored characteristic which is different from said lower layer.

20. The method of claim 19, wherein removal of a portion of either the upper layer and/or the lower layer is carved out until the transparent intermediate layer is reached.

21. The method of claim 20, wherein the composite thermoplastic, continuous laminate is applied to flat N-shaped panels of material.

22. The method of claim 19, wherein the composite thermoplastic, continuous laminate is applied to flat or shaped panels of material.

23. The method of claim 22, wherein removal of a portion of either the upper and/or lower layer is carried out until the transparent intermediate layer is reached.

24. The method of claim 20, wherein said removal is effected by chemical treatment.

25. The method of claim 20, wherein said removal is effected by mechanical machining.

* * * * *

UNITED STATES PATENT AND TRADEMARK OFFICE
CERTIFICATE OF CORRECTION

PATENT NO. : 6,214,439 B1
DATED : April 10, 2001
INVENTOR(S) : Dino Meneghin et al.

It is certified that error appears in the above-identified patent and that said Letters Patent is hereby corrected as shown below:

<u>Title page,</u>
Please insert category (30) Foreign Application Priority Data as follows:
-- (30) Foreign Application Priority Data
      April 8, 1997   [IT] Italy ............................... VE97A000012 --.

Signed and Sealed this

Ninth Day of April, 2002

*Attest:*

JAMES E. ROGAN
*Attesting Officer*     *Director of the United States Patent and Trademark Office*